United States Patent [19]

Wavre

[11] Patent Number: 4,661,678

[45] Date of Patent: Apr. 28, 1987

[54] EDM APPARATUS PROVIDED WITH MEANS FOR HOLDING A PORTION CUT OFF FROM THE WORKPIECE

[75] Inventor: Alain Wavre, Geneva, Switzerland

[73] Assignee: Charmilles Technologies S.A., Geneva, Switzerland

[21] Appl. No.: 724,526

[22] Filed: Apr. 18, 1985

[30] Foreign Application Priority Data

Apr. 18, 1984 [CH] Switzerland ............... 2017/84

[51] Int. Cl.⁴ ............... B23H 7/02; B23Q 1/04
[52] U.S. Cl. ............... 219/69 W; 204/206; 204/224 M; 219/69 R; 269/71
[58] Field of Search ............... 219/69 M, 69 E, 69 W, 219/68, 69 R; 108/1, 6, 9, 28, 137, 138, 149, 150; 204/206, 224 M, 297 R; 269/49, 71, 73

[56] References Cited

U.S. PATENT DOCUMENTS

| | | | |
|---|---|---|---|
| 3,700,228 | 10/1972 | Peale | 269/71 |
| 3,731,044 | 5/1973 | Ullmann et al. | 219/69 W |
| 3,764,126 | 10/1973 | Arenas | 269/71 |
| 3,875,872 | 4/1975 | Kayner | 108/1 |
| 4,029,929 | 6/1977 | Rietveld | 219/69 W |
| 4,262,891 | 4/1981 | Kinney | 269/71 |
| 4,376,241 | 3/1983 | Fricker | 219/69 W |
| 4,484,052 | 11/1984 | Inoue | 219/69 M |
| 4,486,642 | 12/1984 | Inoue | 219/69 M |
| 4,544,819 | 10/1985 | Nomura et al. | 219/69 M |
| 4,547,646 | 10/1985 | Briffod | 219/69 M |
| 4,553,483 | 11/1985 | Votteler et al. | 108/1 |

FOREIGN PATENT DOCUMENTS

| | | | |
|---|---|---|---|
| 100782 | 2/1984 | European Pat. Off. | 219/69 M |
| 2413024 | 10/1975 | Fed. Rep. of Germany | 269/71 |
| 2272789 | 12/1975 | France | 269/73 |
| 2462124 | 3/1981 | France | 108/150 |
| 202721 | 11/1983 | Japan | 219/69 M |

*Primary Examiner*—A. D. Pellinen
*Assistant Examiner*—Geoffrey S. Evans
*Attorney, Agent, or Firm*—Hauke and Patalidis

[57] ABSTRACT

In a travelling wire EDM apparatus for effecting a cut by electrical discharges on a workpiece blank by an electrode wire, the workpiece blank is supported by two support members mounted on a rotary table, one support member being disposed in the interior of the perimeter of the cutting path and the other support member being disposed exteriorly to the perimeter of the cutting path such as to support the two portions of the workpiece blank severed from each other during the cutting operation. A partial cut is first effected through the workpiece blank and the workpiece blank is subsequently angularly oriented to a different position by rotating the rotary table such that collision between any one of the electrode wire support arms and the workpiece blank support member disposed within the perimeter of the cutting path is prevented. The cut is continued along a cutting path corrected as a function of the new angular position of the workpiece, and at the end of the cut the portion severed from the workpiece blank is supported by the support member disposed within the perimeter of the cutting path and the remaining of the workpiece blank is supported by the other support member.

23 Claims, 6 Drawing Figures

EDM APPARATUS PROVIDED WITH MEANS FOR HOLDING A PORTION CUT OFF FROM THE WORKPIECE

BACKGROUND OF THE INVENTION

The present invention relates to travelling wire EDM apparatus and method, in general, and more particularly to an apparatus and method for holding a portion of the workpiece severed from the remaining of the workpiece at the end of a cutting operation.

While severing a portion from a workpiece blank in the course of effecting a closed loop cut in the workpiece blank by an electrode wire in a travelling wire EDM apparatus, for example when cutting an opening in a die or when cutting a punch, the weight of the portion of the workpiece material situated in the interior of a closed loop cutting path causes substantial internal stresses in the workpiece towards the end of the cut, which in turn causes machining defects. In addition, the sudden fall of the cut-off portion at the end of the cutting operation may cause substantial damages, and it is desirable to prevent the fall of the cut-off portion. Diverse holding fixtures have been designed in the past to solve the problem, for example in the form of a removable support disposed below the portion cut-off from the workpiece blank, or in the form of a stationary support provided with a slot through which the electrode wire is passed and on which slides the workpiece blank in a direction perpendicular to the axis of the slit, or yet taking the form of a plurality of movable support arms engaged under the workpiece blank and driven in rotation during the cutting operation. The first and third of the solutions hereinabove mentioned solve only partially the problem while the second solution presents the inconvenience of requiring a sliding support which must support the workpiece blank with a high accuracy, which in turn requires a cumbersome and expensive structure together with the requirement that the lower surface of the workpiece blank be strictly in a single plane.

SUMMARY OF THE INVENTION

The principal object of the present invention is to overcome the inconveniences and limitations of the prior art presented by support means for holding a portion of a workpiece severed from the remaining of the workpiece blank in the course of a cut-off operation effected in a travelling wire EDM apparatus.

The invention accomplishes its object by providing a permanent support for both the workpiece blank and the portion being severed from the blank, without running the risk of collision between the electrode wire or the wire support members with the member supporting simmultaneously the workpiece blank and the portion being severed from the blank.

The many objects and advantages of the present invention will become apparent to those skilled in the art when the following description of the best mode contemplated, at the present, for practicing the invention is read in conjunction with the accompanying drawing in which:

DETAILED DESCRIPTION OF THE PREFERRED EMBODIMENTS

Figure 1A:
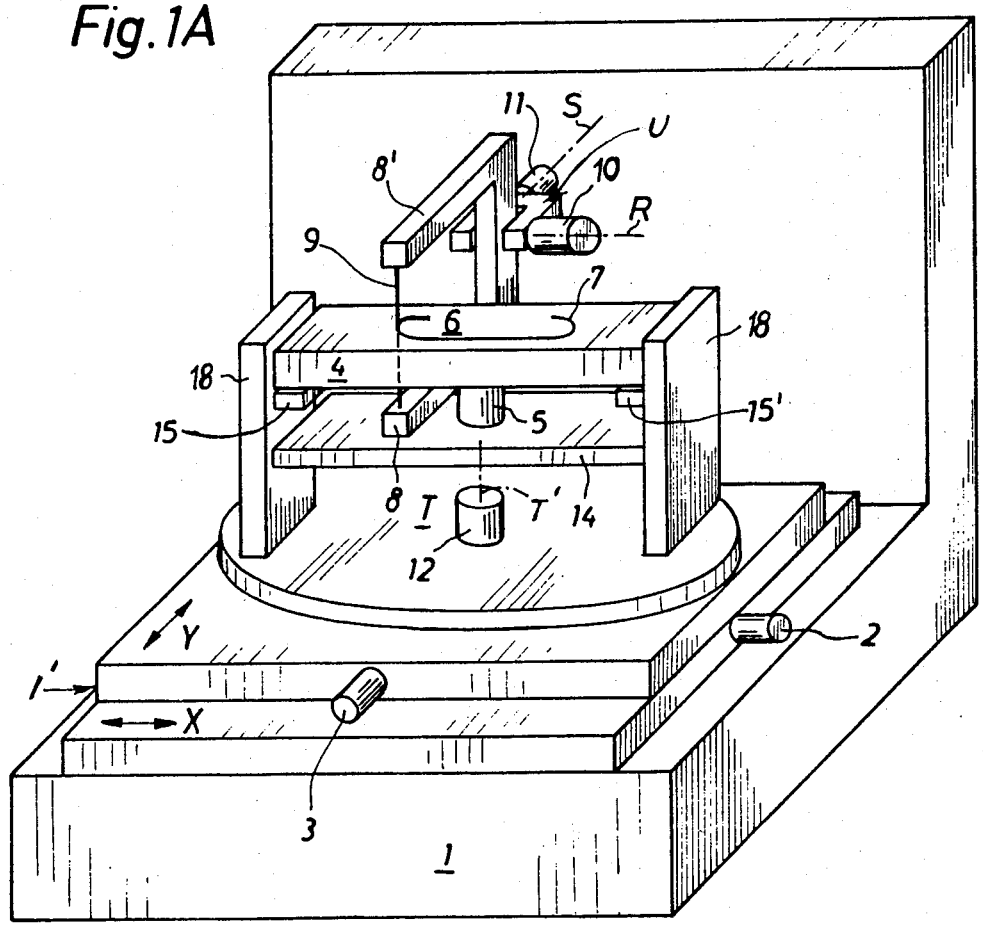
FIGS. 1A, 1B and 1C and 1B schematically illustrate in perspective three examples of structure according to the invention.

In the example of structure illustrated at FIG. 1A, a travelling wire EDM apparatus is schematically illustrated as comprising a generally L-shaped support base 1 supporting a cross-slide table 1' whose slides are displaced respectively along an X-axis and a Y-axis by a servo motor 2 and a servo motor 3. A workpiece blank 4, from which a portion is to be severed, is supported on the cross-slide table 1' through the intermediary of a rotary table T having an axis of rotation T' perpendicular to the plane of the top of the cross-slide table 1', the rotary table T being driven in rotation by a servo motor 12. An intermediary plate 14 is attached at each end to one of a pair of upright members 18 mounted on the top of the rotary table T. The workpiece blank 4 is supported between the upright members 18 by a pair of support members 15 and 15', each attached to a side of an upright member 18. The workpiece blank 4 is attached to the support members 15 and 15' in any conventional manner such as by means of clamps, not shown, for example, or it may simply be supported by the support members 15 and 15', without being attached thereto. A post 5 carried by the intermediary plate 14 is disposed below the workpiece blank 4 such as to support it together with a portion 6 of the workpiece blank which is to be severed from the blank as a result of effecting a cut in the workpiece blank along a closed loop cutting path 7 by means of an electrode wire 9 supported and stretched between a pair of support arms 8 and 8', the wire support arm 8' extending above and the wire support arm 8 extending below the workpiece blank 4. The post 5 is located under the workpiece blank 4 such as to engage its bottom at an area of its lower surface belonging to the portion 6 of the workpiece blank to be severed from the remaining of the blank. The workpiece blank 4 may simply rest on top of the post 5 or be attached thereto, for example by means of an adhesive. Whatever the arrangement chosen, the post 5 supports the portion 6 when it is partially severed from the remaining of the workpiece blank 4 close to the end of the cut, when the path 7 of the cut has almost accomplished a complete loop, and the post 5 prevents the weight of the portion 6 from being supported solely through the narrow bridging portion of material still connecting the portion 6 to the remaining of the workpiece blank 4, which otherwise would cause undue stress and undesirable deformation of the metal in the vicinity of the bridging portion. When the cut is completed, when the path 7 of the cut is completely closed, the post 5 prevents the cut-off portion 6 from falling, and thus prevents any damage which could sometime be substantial, more particularly when the cut-off portion 6 is relatively heavy. The remaining of the workpiece blank 4 is evidently supported by the support members or brackets 15 and 15' attached to the upright members 18.

The support arms 8 and 8' of the electrode wire 9 are in turn supported by a gimbal or universal joint U about two perpendicular axes R and S relative to the frame 1 of the apparatus. A pair of servo motors 10 and 11 control the angular position of the electrode wire 9 relative to the apparatus frame 1 and, consequently, relative to the workpiece blank 4 during machining, while the motion of the cross-slide table 1' along the X- and Y-axes controls the shape and dimensions of the cutting path 7 in the workpiece blank, as is well known in the travelling wire EDM cutting technology. The rotation of the rotary table T around its axis of rotation T', under the control of the servo motor 12, enables the electrode wire 9 to effectuate a closed loop cut in the workpiece blank 4 while preventing the electrode wire lower support arm 8 from colliding with the post 5, as graphically represented in the diagrams of FIGS. 3 and 4.

Figure 2:
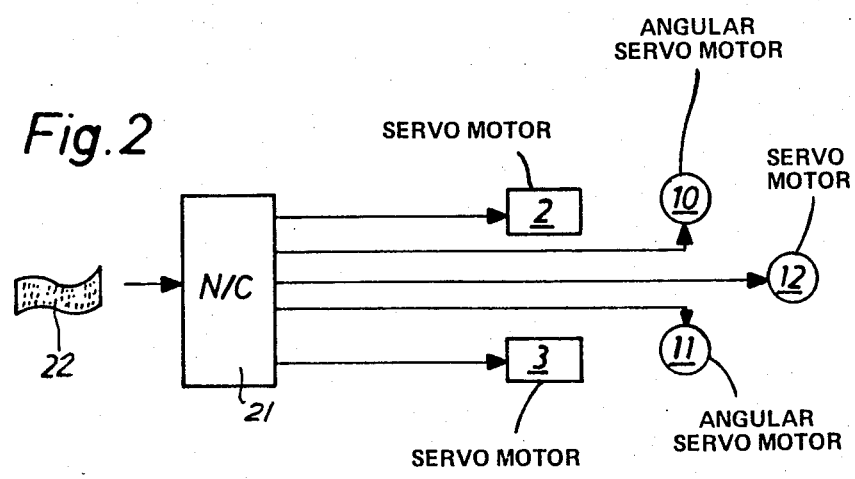
FIG. 2 is a simplified block diagram representation of the numerical control of the servo motors of the structure of FIG. 1A.

FIG. 2 illustrates schematically the operation of the numerical control unit 21 according to information data recorded on an appropriate member 22, such as a perforated tape or a magnetic tape, in the usual well known manner. According to the information data recorded on the member 22 the numerical control unit 21 controls, as is well known in the art, the operation of the servo motors 2, 3, 10 and 11 to cause the electrode wire 9 to cut the workpiece 4 according to a predetermined path programmed on the member 22. The servo motor 12, however, is used in conjunction with the servo motors 2 and 3 to prevent collision between the wire electrode lower support arm 8 and the post 5 when the electrode wire 9 effectuates a closed loop cut in the workpiece blank 4.

Figure 3:
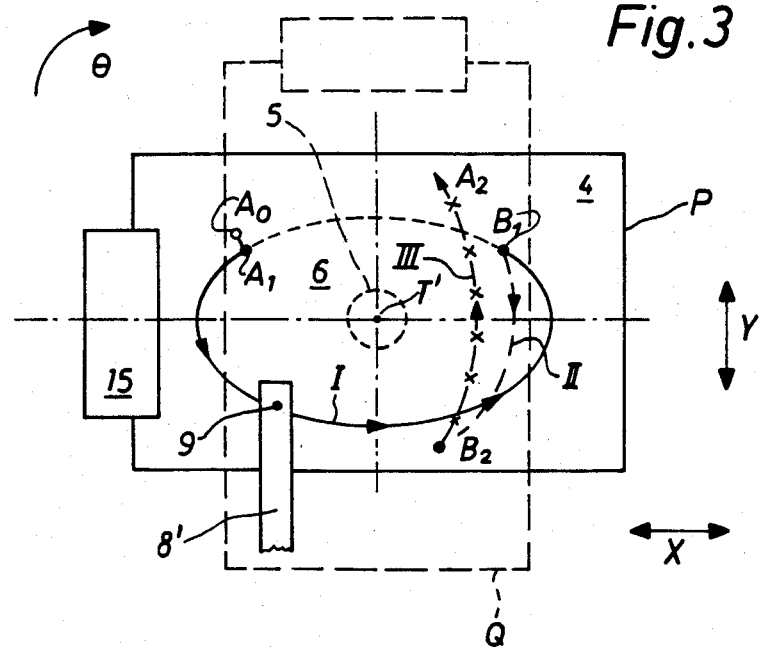
FIG. 3 is a schematic diagram explaining the operation of the present invention in the case of a closed loop cutting pass for a part supported by a central support member, the workpiece blank being supported by a single lateral support member.

FIG. 3 illustrates graphically a cutting operation for severing a portion 6 having an elliptical perimeter from the workpiece blank 4, the workpiece blank 4 being supported at one end only by the support member or bracket 15, the second support member or bracket 15' (FIG. 1A) being omitted. Under some conditions, for example for supporting workpiece blanks which are relatively small or of light weight, the second support member or bracket is often unnecessary. The portion 6 to be severed from the workpiece blank is supported, as in the structure of FIG. 1A by a post 5 disposed below the portion 6 to be cut off from the workpiece blank for preventing the fall of the portion 6 at the end of the cut. At the beginning of the cut, the workpiece 4 is in the position P indicated in full line at FIG. 3. The electrode wire 9 is threaded through a starting hole $A_0$, and after effecting a preliminary cut from the starting hole $A_0$ to the point $A_1$, a first cut is effected along the cutting path I from $A_1$ to $B_1$. While effecting that cut, the workpiece blank 4 is held substantially in the position P, i.e., the motions of the cross-slide table 1' of FIG. 1A are effected along the X- and Y-axes although rotation around the R- and S-axes may be effected by the electrode wire support arms 8 and 8' in order to provide the electrode wire 9 with a desired inclindation such as to provide the peripheral face of the portion 6 with a desired angle. When the electrode wire reaches the location of the point $B_1$, the workpiece blank 4 is rotated around the axis T' of rotation of the rotary table T (FIG. 1A) of an appropriate angle $\theta$, preferably 90°. The axis T' of rotation of the rotary table T, FIG. 1A, is assumed to be perpendicular to the plane of FIG. 3 and, for the sake of clarity, it is also assumed to be coaxial with the post 5 and to be located at the center of the elliptical cut being effected in the workpiece blank 4. Those relative positions are not critical, but are only assumed in order to simplify the drawing. The post 5 could very well be located outside of the projection of the center of gravity of the workpiece blank 4, although locating the post 4 under the center of gravity of the workpiece blank is preferably. In the course of a simple rotation of the workpiece blank 4 around the axis T' of rotation of the rotary table T, without any linear motion of the cross-slide table 1', the point $B_1$ is displaced relative to the cross-slide table 1' (FIG. 1A) along an arc II to the point $B_2$. As there is a requirement that the electrode wire remain stationary relative to the workpiece blank 4 during rotation of the workpiece blank, the numerical control unit 21 (FIG. 2) commands the servo motors 2 and 3 such as to cause displacement of the cross-slide table 1' to cause the electrode wire 9 to remain at the position represented by the point $B_1$ during the rotation cycle. If the electrode wire 9 is not perpendicular to the plane of the top of the cross-slide table 1', but is disposed at an angle thereto, there is an added requirement to maintain the orientation of the wire constant during rotation of the workpiece blank 4 around the axis T' of rotation of the rotary table T. Such constant angular orientation of the electrode wire 9 is achieved as a result of the numerical control unit 21 (FIG. 2) providing appropriate command signals to the servo motor 10 and 11 (FIGS. 2 and 1A).

After the 90° rotation of the workpiece blank 4 around the axis of rotation T', the workpiece blank is in the position Q shown in dotted lines at FIG. 3, and all that remains to be done is to effectuate a cut along the remaining section III of the cutting path from $B_1$ to $A_1$. The section III can easily be determined by rotating by 90° the cutting path section $B_1$ to $A_1$ which remains to be cut prior to rotating the workpiece blank 4 from the position P to the position Q. It is readily apparent that in the course of effecting that cut the electrode wire lower support arm 8, which is disposed directly below the support arm 8' shown at FIG. 3 never engages either the post 5 or the workpiece support member or bracket 15, even though it may be assumed that the support platform 15 extends downwardly to a location lower than that of the support arm 8.

Figure 4:
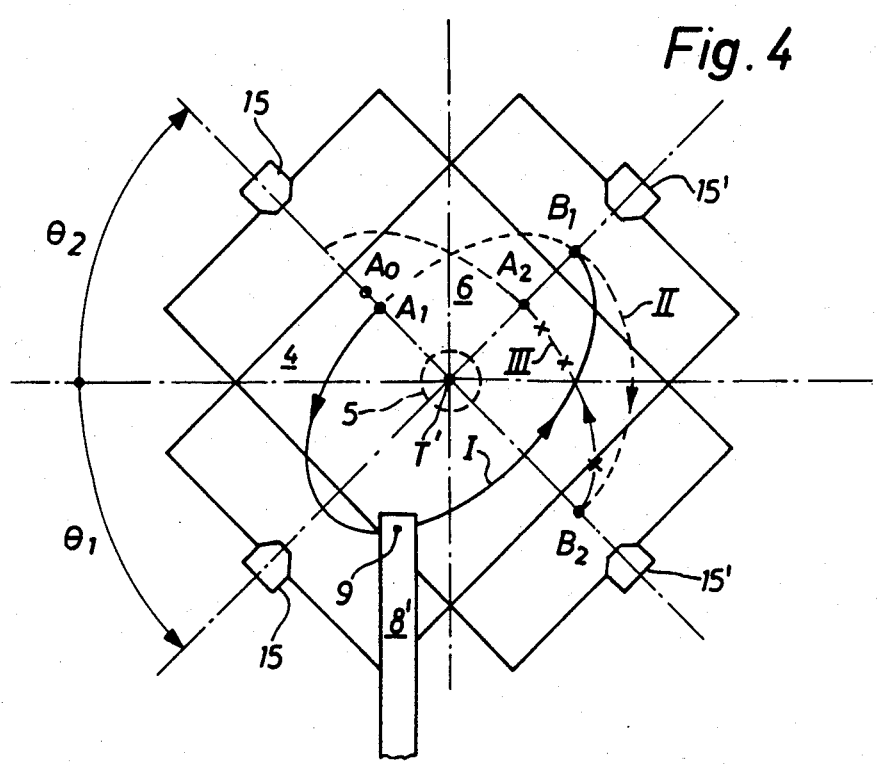
FIG. 4 is a schematic diagram similar to that of FIG. 3 but showing a modification of the invention, wherein the workpiece blank is supported by a pair of support members disposed on opposite sides of the blank.

FIG. 4 is similar to the diagram of FIG. 3 and uses the same reference numerals to represent the same or equivalent elements but, in the illustration of FIG. 4, the workpiece blank 4 is held by means of a pair of lateral support members 15 and 15' disposed at opposite ends of the workpiece blank, as is generally the case when machining workpiece blanks of large dimensions. It is assumed also that the home position of the workpiece blank 4, not shown on the drawings, is such that the shorter centerline of the workpiece blank is parallel to the support arms 8 and 8' of the electrode wire 9. Prior to starting the cut in the workpiece blank 4, the workpiece blank is rotated of an angle $\theta_1$ around the axis T'. A cut is subsequently effected along the cutting path I from $A_0$ to $A_1$ and to $B_1$. Subsequently, the workpiece blank 4 is rotated 90° in an opposite direction thereby bringing the workpiece blank to an angular position at an angle $\theta_2$ beyond its home position. In the course of the second rotation of the workpiece blank, the cross-slide table 1' (FIG. 1A) is actuated such that the position of the electrode wire 9 and its longitudinal orientation relative to the workpiece blank 4 remains constantly unchanged, as hereinbefore explained with respect to the diagram of FIG. 3. Thereafter, the cut is continued along the section III of the cutting path from point $B_2$ to point $A_2$, which is the representation obtained by rotating by 90° the section $B_1 A_1$ of the cutting path. It will be appreciated that in the representation illustrated at FIG. 4, any collision between the electrode wire support arms 8 and 8' and the post 5 is avoided as well as any collision between the electrode wire support arms 8 and 8' and the workpiece support members 15 and 15' or with any upward or downward projection of a support member, at any time during the cutting operation.

It is to be noted that the description of the motion of the workpiece and of the cutting operation hereinbefore described is effected in three entirely separate steps, namely two EDM cuts and one adjustment of the position of the workpiece relative to the electrode wire support arms, the latter being not absolutely necessary. It is also possible to appropriately synchronize the two necessary motions, one for effecting the EDM cutting operation itself and the other to avoid any collisions between the members supporting the workpiece blank and the arms supporting the electrode wire such that the relative motions are accomplished simultaneously, which avoids any stoppage of the cutting operation. The choice of one or the other of the alternative methods is dependent upon practial considerations.

Figure 1B:
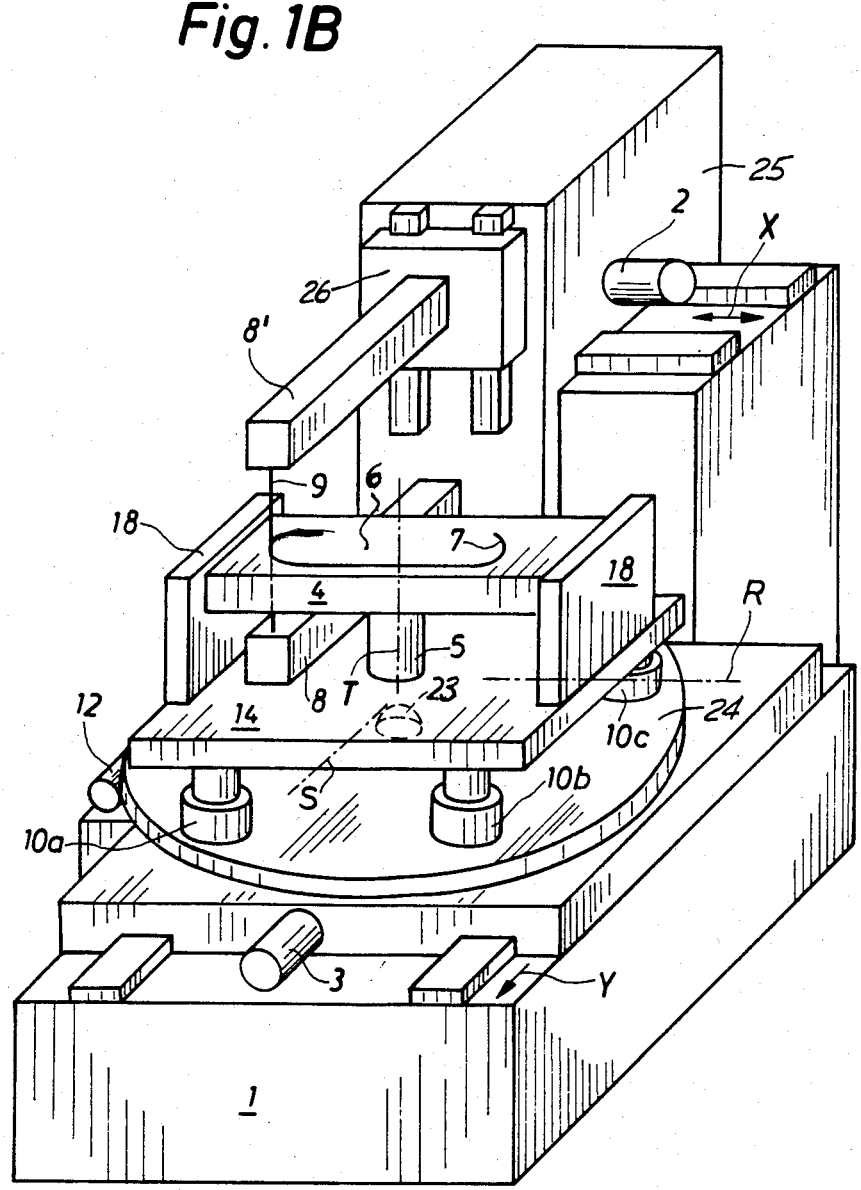

It is further to be noted that the structure for supporting the electrode wire support arms 8 and 8' by means of a universal joint arrangement, as illustrated at FIG. 1A, could be replaced by a plate supporting the workpiece blank 4 and capable of being inclined by means of at least three vertically acting hydraulic or electric jacks. For the purpose of reducing the load imposed upon the plate on the jacks, the plate, shown at 14 at FIG. 1B, could be supported, and is illustrated as being supported, by a ball and socket joint 23 installed between the plate 14 and a rotary table 24. The remaining elements illustrated at FIG. 1B are the same or the equivalent of the elements illustrated at FIG. 1A which are indentified by the same reference numerals. Such elements and their function will therefore not be described again with respect to the structure illustrated at FIG. 1B. However, a modification of the structure relates to the mechanism for adjusting the orientation of the workpiece blank 4 relative to the longitudinal axis of the electrode wire 9, which is accomplished by the hydraulic or electric jacks 10A, 10B and 10C, a fourth jack being disposed between the plate 14 and the rotary table 24, if so desired. The jacks 10A, 10B and 10C, when activated differentially, permit to pivot the plane of the plate 14 relative to the plane of the rotary table 24 around the ball and socket joint 20, and to hold the plate 14 in any inclination with accuracy. The rotary table 24 supporting the jacks is controlled in rotation by the servo motor 12, whose function is the same as that of the servo motor 12 shown at FIG. 1A. The rotary table 24 is displaced along the Y-axis by the servo motor 3, the relative displacement along the X-axis between the workpiece blank 4 and the electrode wire 9 being obtained when the servo motor 2 is activated, thus displacing along the X-axis a slide 25 supporting in turn the electrode wire support arms 8 and 8'. The electrode wire support arm 8', as illustrated in the structure of FIG. 1B, is mounted on a slide 26 such as to be adjustably displaceable along a vertical axis to accommodate diverse thicknesses of workpiece blanks.

Figure 1C:
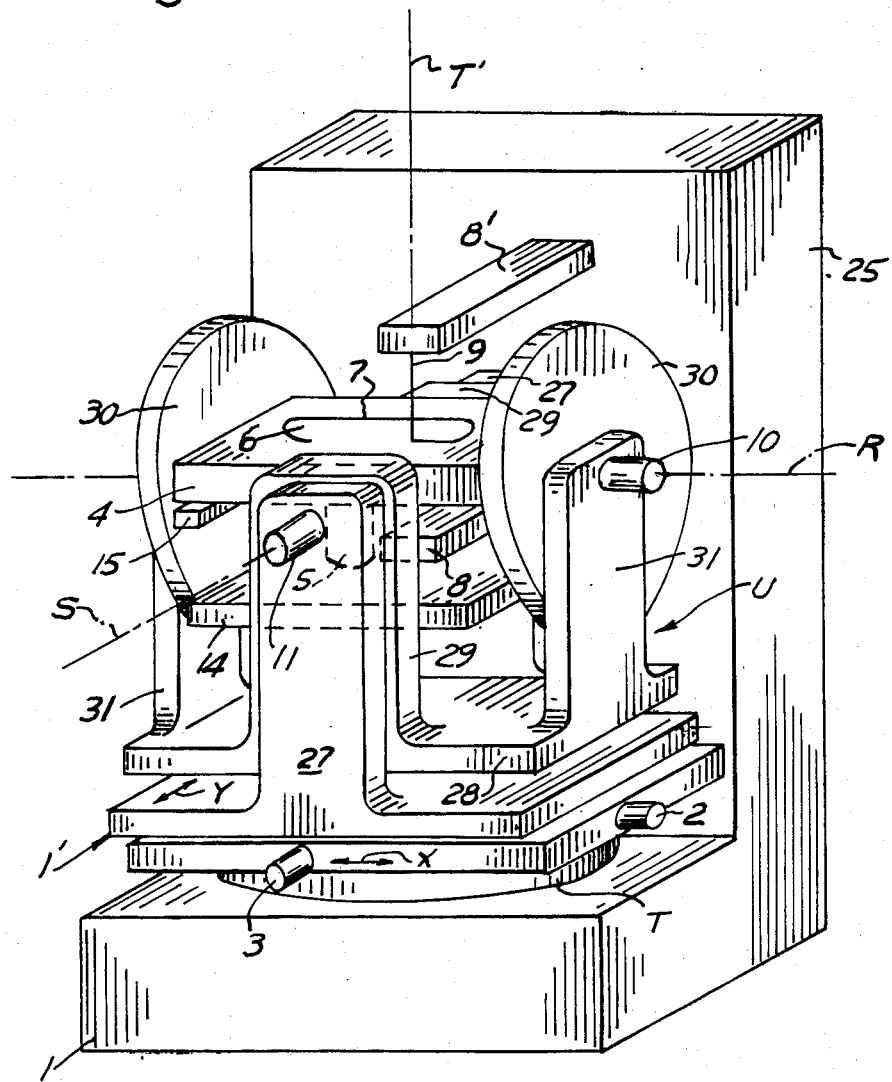

FIG. 1C schematically illustrates a modified structure, as compared to the structures of FIGS. 1A and 1B, bearing the same reference numerals to indicate indentical or equivalent elements. In the structure of FIG. 1C however, it is the workpiece blank 4 that is supported by a gimbal or universal joint-type support means permitting inclination of the workpiece blank about the cross axes R and S.

The structure illustrated at FIG. 1C is different from that illustrated at FIG. 1A in that, in the structure of FIG. 1A, the cross-slide table 1' supports the rotary table T rotatable around the axis T', while in the structure illustrated at FIG. 1C, it is the rotary table T that supports the cross-slide table 1', therefore rotating the cross-slide table 1' around the axis T' of rotation of the rotary table T. The result is that, as shown at FIG. 1C, the axis T' remains constantly at the same position relative to the electrode wire 9, which presents the advantage that the axis T' may be exactly aligned with the longitudinal axis of the electrode wire 9. Consequently, irrespective of the position of the top of the cross-slide table 1', any rotation of the cross-slide table around the axis T' does not influence the orientation of the longitudinal axis of the wire 9 relative to the workpiece blank 4. The rotary motion required to avoid a collision between one of the electrode wire support arms 8 and 8' and the support members for the workpiece blank 4 can be effected at any time and without complex calculation by way of a simple rotation of the cross-slide table 1' around the axis T', event though the electrode wire 9 may be intersecting the workpiece blank 4 at an angle other than a right angle. More particularly, the result is that the movement effected by the workpiece blank 4 in rotation may be effected continuously during the whole cutting operation, thus avoiding any interruption in the machining of the workpiece blank due to sudden transition from one functional mode to another, as for example when stopping machining while re-orienting the workpiece blank 4 relative to the electrode wire 9 by combining rotary motion and linear motion of the workpiece blank.

In the example of structure illustrated at FIG. 1C, the gimbal or universal joint support means V for the workpiece blank 4 takes the form of a pair of parallel upright members 27 mounted on the top of the cross-slide table 1' and pivotably supporting a plate 28 around the axis S, the plate 28 being provided for that purpose with a pair of upright members 29. The plate 28 pivotally supports in turn the intermediary plate 14, the intermediate plate 14 being attached at each end to a flange 30. The flanges 30 are in turn pivotably supported from the plate 28 around the axis R by a pair of upright support members 31 disposed at opposite ends of the plate 28. As in the previously described structures, the intermediary plate 14 carries the post 5 whose top supports the portion 6 being severed from the workpiece blank 4.

It will be appreciated by those skilled in the art that the electrode wire 9 stretched between and held by the electrode wire support arms 8 and 8' is, in actuality, a continuous metallic wire obtained, for example, from a supply reel or spool. The wire 9 is continuously fed longitudinally between the wire support arms 8' and 8, which are provided for that purpose with appropriate wire support and guide members, an appropriate feeding mechanism, not shown, being provided such that the electrode wire 9 is continuously displaced longitudinally for renewing the wire in the machining zone between the wire and the workpiece blank 4 while effecting a cut 7 in the workpiece blank 4. It will also be appreciated by those skilled in the art that the electrode wire 9 and the workpiece blank 4 are connected across an appropriate electrical pulse generator for providing machining electrical discharges between the electrode wire 9 and the workpiece blank 4 in the machining zone, and that a dielectric machining fluid and coolant is supplied to the machining zone in the course of a cutting operation. All such elements are well known in the art of EDM technology and are not shown in the drawing nor described in the specification.

Having thus disclosed the present invention by way of examples of structure given for illustrative purpose only, modifications whereof will be apparent to those skilled in the art, what is claimed as new is as follows:

1. A traveling wire EDM apparatus for cutting a portion from a workpiece blank along a closed loop cutting path by means of an electrode wire, said electrode wire being stretched between two support arms, said apparatus comprising at least two workpiece blank support members, one of said support members being operative and arranged to continually support the portion of the workpiece blank being severed from the workpiece blank during the entire duration of the closed loop cutting operation and the other of said support members being operative and arranged to continually support the workpiece blank during the entire duration of the closed loop cutting operation, means for effecting a relative linear displacement between the electrode wire support arms and the workpiece blank support members across two crossed axes in a single plane such as to cut said portion from the workpiece blank along the closed cutting path, means for effecting a relative rotational displacement of the workpiece blank support members around an axis of rotation perpendicular to the plane formed by said cross axes, and control means for coordinating said relative linear and rotational displacement and operative to rotate said workpiece blank around a point of intersection between the electrode wire and the cutting path in the workpiece blank at a time between the beginning and the end of a closed loop cut in a manner to prevent collision between one of said electrode wire support arms and said workpiece blank support members.

2. The apparatus of claim 1 wherein said control means is arranged to coordinate said linear and rotational displacements such as to effect a cut along a first portion of the cutting path with a first orientation of said support members and to terminate the cut along said cutting path with a second orientation of said support members.

3. The apparatus of claim 1 wherein said means for effecting a rotational displacement of the workpiece blank support members around an axis of rotation is supported by said means effecting said linear displacement.

4. The apparatus of claim 2 wherein said means for effecting a rotational displacement of the workpiece blank support members around an axis of rotation is supported by said means effecting said linear displacement.

5. The apparatus of claim 1 wherein said means for effecting said linear displacement is disposed above said means for effecting said rotational displacement of the workpiece blank support members.

6. The apparatus of claim 2 wherein said means for effecting said linear displacement are disposed above said means for displacing in rotation the workpiece blank support members.

7. The apparatus of claim 5 wherein the axis of rotation is aligned with the electrode wire longitudinal axis.

8. The apparatus of claim 6 wherein the axis of rotation is aligned with the electrode wire longitudinal axis.

9. The apparatus of claim 1 wherein the support member supporting the portion of the workpiece blank being severed from the remaining of the workpiece blank in the course of the cut is disposed along said axis of rotation.

10. The apparatus of claim 2 wherein the support member supporting the portion of the workpiece blank being severed from the remaining of the workpiece blank in the course of the cut is disposed along said axis of rotation.

11. The apparatus of claim 3 wherein the support member supporting the portion of the workpiece blank being severed from the remaining of the workpiece blank in the course of the cut is disposed along said axis of rotation.

12. The apparatus of claim 4 wherein the support member supporting the portion of the workpiece blank being severed from the remaining of the workpiece blank in the course of the cut is disposed along said axis of rotation.

13. The apparatus of claim 5 wherein the support member supporting the portion of the workpiece blank being severed from the remaining of the workpiece blank in the course of the cut is disposed along said axis of rotation.

14. The apparatus of claim 6 wherein the support member supporting the portion of the workpiece blank being severed from the remaining of the workpiece blank in the course of the cut is disposed along said axis of rotation.

15. The apparatus of claim 7 wherein the support member supporting the portion of the workpiece blank being severed from the remaining of the workpiece blank in the course of the cut is disposed along said axis of rotation.

16. The apparatus of claim 8 wherein the support member supporting the portion of the workpiece blank being severed from the remaining of the workpiece blank in the course of the cut is disposed along said axis of rotation.

17. The apparatus of claim 1 wherein said electrode wire support arms are supported relative to said EDM apparatus by gimbal joint support means.

18. The apparatus of claim 2 wherein said electrode wire support arms are supported relative to said EDM apparatus by gimbal joint support means.

19. The apparatus of claim 3 wherein said electrode wire support arms are supported relative to said EDM apparatus by gimbal joint support means.

20. The apparatus of claim 4 wherein said electrode wire support arms are supported relative to said EDM apparatus by gimbal joint support means.

21. The apparatus of claim 1 wherein said workpiece blank is supported by gimbal joint support means.

22. The apparatus of claim 5 wherein said workpiece blank is supported by gimbal joint support means.

23. The apparatus of claim 6 wherein said workpiece blank is supported by gimbal joint support means.

* * * * *

UNITED STATES PATENT AND TRADEMARK OFFICE
CERTIFICATE OF CORRECTION

PATENT NO. : 4,661,678

DATED : April 28, 1987

INVENTOR(S) : Alain Wavre

It is certified that error appears in the above-identified patent and that said Letters Patent is hereby corrected as shown below:

In the Abstract, line 21, delete "remaining" and insert --remainder--.

Col. 1, line 10, delete "remaining" and insert --remainder--.

Col. 1, line 48, delete "remaining" and insert --remainder--.

Col. 1, line 67, delete "structure" and insert --structures--.

Col. 2, line 49, delete "remaining" and insert --remainder--.

Col. 2, line 54, delete "remaining" and insert --remainder--.

Col 2, line 59, delete "remaining" and insert --remainder--.

Col. 2, line 65, delete "sometime".

Col. 2, line 67, delete "remaining" and insert --remainder--.

Col. 2, line 68, delete "evidentally".

Col. 3, line 64, delete "of".

UNITED STATES PATENT AND TRADEMARK OFFICE
CERTIFICATE OF CORRECTION

PATENT NO. :  4,661,678

DATED      :  April 28, 1987

INVENTOR(S) :  Alain Wavre

It is certified that error appears in the above-identified patent and that said Letters Patent is hereby corrected as shown below:

Col. 4, line 7, delete "preferably" and insert --preferable--.

Col. 4, line 57, delete "of".

Col. 5, line 49, delete "permit to".

Col. 5, line 51, delete "to".

Col. 6, line 46, delete "intermediate" and insert --intermediary--.

Col. 7, line 11, delete "whereof" and insert --thereof--.

Col. 7, line 12, delete "whet" and insert --what--.

<u>IN THE CLAIMS</u>:

Claim 10, line 14, delete "remaining" and insert --remainder--.

Claim 11, line 19, delete "remaining" and insert --remainder--.

Claim 12, line 24, delete "remaining" and insert --remainder--.

UNITED STATES PATENT AND TRADEMARK OFFICE
CERTIFICATE OF CORRECTION

PATENT NO. : 4,661,678
DATED : April 28, 1987
INVENTOR(S) : Alain Wavre

It is certified that error appears in the above-identified patent and that said Letters Patent is hereby corrected as shown below:

Claim 13, line 29, delete "remaining" and insert --remainder--.

Claim 14, line 34, delete "remaining" and insert --remainder--.

Claim 15, line 39, delete "remaining" and insert --remainder--.

Claim 16, line 44, delete "remaining" and insert --remainder--.

Signed and Sealed this

Eighth Day of December, 1987

*Attest:*

DONALD J. QUIGG

*Attesting Officer*   *Commissioner of Patents and Trademarks*